US011329760B2

(12) United States Patent
Hosein et al.

(10) Patent No.: US 11,329,760 B2
(45) Date of Patent: May 10, 2022

(54) METHOD AND APPARATUS FOR SCHEDULING MULTIMEDIA STREAMS OVER A WIRELESS BROADCAST CHANNEL

(71) Applicant: Futurewei Technologies, Inc., Plano, TX (US)

(72) Inventors: Patrick Hosein, San Diego, CA (US); Thawatt Gopal, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/261,228

(22) Filed: Jan. 29, 2019

(65) Prior Publication Data

US 2019/0158215 A1 May 23, 2019

Related U.S. Application Data

(63) Continuation of application No. 12/353,840, filed on Jan. 14, 2009, now Pat. No. 10,193,655.

(60) Provisional application No. 61/021,266, filed on Jan. 15, 2008.

(51) Int. Cl.
*H04H 20/42* (2008.01)
*H04L 1/00* (2006.01)

(52) U.S. Cl.
CPC ........... *H04L 1/0014* (2013.01); *H04H 20/42* (2013.01)

(58) Field of Classification Search
CPC .. H04L 1/0014; H04H 20/42; H04N 1/00281; H04N 1/00315; H04N 2101/00; H04N 21/4135; H04N 21/4223
See application file for complete search history.

(56) References Cited

U.S. PATENT DOCUMENTS

| 5,848,057 | A | 12/1998 | Lee et al. |
| 6,240,103 | B1 | 5/2001 | Schoenblum et al. |
| 6,266,323 | B1 | 7/2001 | Valko et al. |
| 6,421,387 | B1* | 7/2002 | Rhee ............... H04N 19/89 |
| | | | 375/240.27 |
| 6,477,167 | B1 | 11/2002 | Wu |
| 6,728,584 | B1* | 4/2004 | Duan ............... H04H 60/04 |
| | | | 381/119 |
| 7,006,531 | B2 | 2/2006 | Samrao |
| 7,391,717 | B2 | 6/2008 | Klemets et al. |
| 7,623,496 | B2 | 11/2009 | Kitchin |
| 8,005,102 | B2 | 8/2011 | Hosein |

(Continued)

FOREIGN PATENT DOCUMENTS

| CN | 1848715 A | 10/2006 |
| CN | 1852285 A | 10/2006 |

(Continued)

OTHER PUBLICATIONS

Hosein, P. et al., "Radio Resource Management for Broadcast Services in OFDMA-Based Networks," 2008, 5 pages, IEEE.

(Continued)

*Primary Examiner* — Thinh D Tran
(74) *Attorney, Agent, or Firm* — Slater Matsil, LLP

(57) ABSTRACT

A method of broadcasting data is disclosed. A plurality of broadcast data streams are received and divided into a plurality of frames. Each frame includes data from only one of the broadcast data streams. The frames can then be broadcast wirelessly.

21 Claims, 4 Drawing Sheets

(56) References Cited

U.S. PATENT DOCUMENTS

| | | | |
|---|---|---|---|
| 8,089,855 B2* | 1/2012 | Agrawal | H04B 7/2656 370/208 |
| 2001/0009604 A1* | 7/2001 | Ando | G11B 27/105 386/241 |
| 2005/0141475 A1* | 6/2005 | Vijayan | H04W 4/06 370/345 |
| 2005/0220118 A1 | 10/2005 | Ma et al. | |
| 2007/0025441 A1 | 2/2007 | Ugur et al. | |
| 2007/0076693 A1 | 4/2007 | Krishnaswamy | |
| 2007/0165709 A1* | 7/2007 | Walker | H04L 1/0041 375/219 |
| 2008/0130511 A1 | 6/2008 | Koo et al. | |
| 2008/0159186 A1* | 7/2008 | Steer | H04L 25/0202 370/297 |
| 2008/0170531 A1 | 7/2008 | Petry et al. | |
| 2008/0225838 A1 | 9/2008 | Vesma et al. | |
| 2008/0276287 A1* | 11/2008 | Mizuta | H04N 21/631 725/62 |
| 2009/0010333 A1* | 1/2009 | Tourapis | H04N 19/70 375/240.15 |
| 2009/0028109 A1* | 1/2009 | Huang | H04L 12/189 370/330 |

FOREIGN PATENT DOCUMENTS

| | | |
|---|---|---|
| CN | 101102296 A | 1/2008 |
| KR | 20020087611 A | 11/2002 |

OTHER PUBLICATIONS

Hosein, P., Broadcasting VBR Traffic in a WiMAX Network, Vehicular Technology Conference, Sep. 21-24, 2008, 5 pages, IEEE.

* cited by examiner

METHOD AND APPARATUS FOR SCHEDULING MULTIMEDIA STREAMS OVER A WIRELESS BROADCAST CHANNEL

This application claims the benefit of U.S. Provisional Application No. 61/021,266, filed on Jan. 15, 2008, entitled "Method and Apparatus for Scheduling Multimedia Streams over an OFDMA Broadcast Channel," and U.S. application Ser. No. 12/353,840, filed on Jan. 14, 2009, entitled "Method and Apparatus for Scheduling Multimedia Streams over an OFDMA Broadcast Channel," which are hereby incorporated herein by reference.

TECHNICAL FIELD

The present invention relates generally to a communication system and method, and, in particular embodiments, to a method and apparatus for scheduling multimedia streams over a wireless broadcast channel.

BACKGROUND

Broadcast services can be supported with various technologies including the traditional television broadcasts as well as newer technologies such as DVB-H (Digital Video Broadcasting—Handheld) and MediaFLO. Broadcast services can be also supported over a wireless network, such as a wireless network based on Orthogonal Frequency Division Multiple Access (OFDMA) radio transmission technology.

In providing Broadcast services in a known digital broadcast network, time slicing is usually used in which periodic bursts are allocated to each stream but the channel switching delay is high and the flexibility in multiplexing streams with different rates is limited. In providing Broadcast services in a known cellular based network, multiple streams are usually multiplexed in each transmitted burst. But this results in high terminal power usage and large signaling overhead.

SUMMARY OF THE INVENTION

In one aspect, the present invention provides broadcast services over a wireless network, such as over a 3-4 G wireless network, with advantageous features such as low terminal power usage, low channel switching delay and high broadcast channel utilization.

In a first embodiment, a method of broadcasting data is disclosed. A plurality of broadcast data streams are received and divided into a plurality of frames. Each frame includes data from only one of the broadcast data streams. The frames can then be broadcast wirelessly. Each frame can also include data related to the next frame of the same stream, e.g., so that a mobile receiver does not need to process frames that do not include broadcast data of interest.

In another embodiment, a frame of data is received from a wireless communication link. Broadcast data and next frame information can be retrieved from the frame. The next frame information provides information related to a next frame of data that includes data related to the retrieved broadcast data. In a particular embodiment, frames between the frame of data and the next frame can be ignored, for example, by not processing these frames or placing the receiver in a low power mode.

In another embodiment, a method for transmitting multimedia streams over a wireless access system includes emulating queuing of a generated stream, the queuing being performed at a base station. A data rate of the generated stream is adjusted based upon the emulating and the data rate adjusted generated stream is provided to the base station for wireless broadcast. As an example, the emulation can be performed at a content provider.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
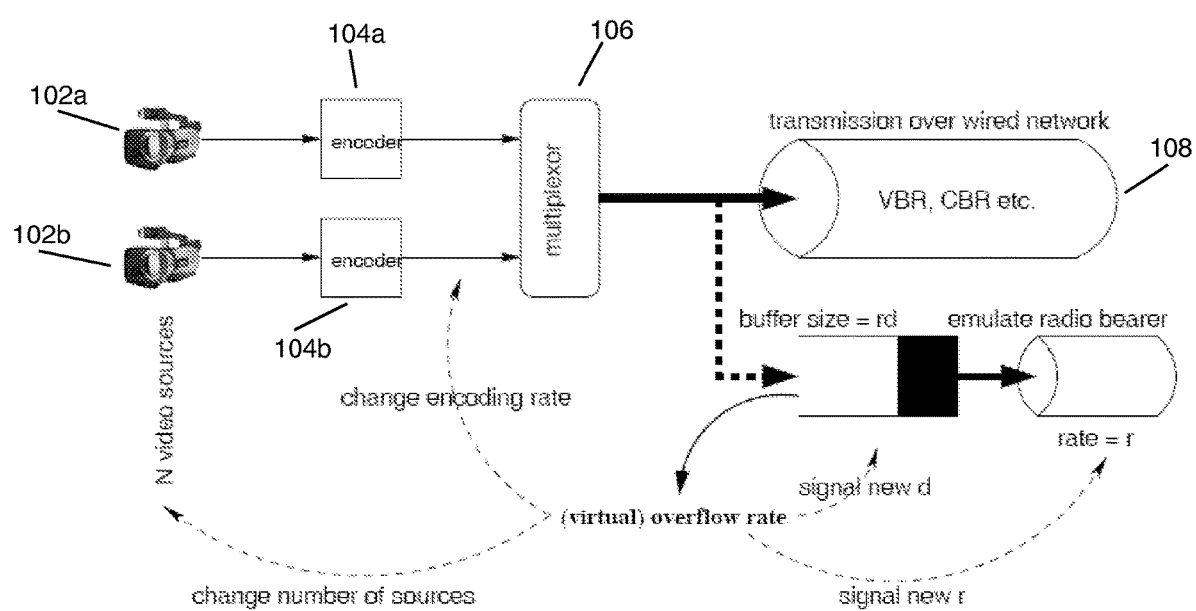
FIG. 1 is a block diagram of an emulation process.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In various aspects, the invention relates to a method and apparatus for scheduling multimedia broadcast services over a wireless communication network based on a wireless access system such as, but not limited to, an Orthogonal Frequency Division Multiple Access (OFDMA) radio transmission technology.

In order to minimize terminal power usage, digital broadcast networks (such as DVB-H and MediaFLO) broadcast each stream in large periodic bursts. Each terminal need only be awake for the bursts of its desired channel. In OFDMA networks, such as WiMAX, the channel burst size is fixed. In order to achieve low power usage, it is optimal to serve a single channel in each broadcast burst. In addition, each frame may include an indication of the index of the next frame for the channel so that the terminal will know when next to awake (because the service times need not be periodic). In preferred embodiments, a novel scheduling algorithm for achieving both of these goals is described. It is shown how traffic can be shaped by the content provider to conform to the specific constraints of the wireless network. Advantageous features include low terminal power usage, low channel switching delay and high broadcast channel utilization.

In OFDMA, frequency (subcarrier) and time (symbol) resources are allocated to a subset of users in each frame. This allocation will typically depend on the nature of the traffic and, in the case of VoIP and data services, such as the channel conditions being experienced by the users. In the case of broadcast services, sufficient power and bandwidth resources are preferably allocated to achieve the desired coverage for the given cell site separation. The allocated resources are kept constant so as not to affect resources needed for other services. Since these resources are fixed and the modulation and coding scheme is also fixed then the number of bits that can be transmitted within the zone is also fixed.

Multiple streams from possibly multiple content providers may be multiplexed over this fixed rate broadcast channel. If data from multiple streams are included within a single frame then signaling information may be included in the downlink MAP (Mobile Application Part) message to indicate the location of the data for each of the included streams. Each terminal can then decode the portions of the frame that include data for its desired channel.

In a preferred embodiment of the invention, the approach is taken to transmit data for only one stream in each zone. This results in lower signaling overhead but more importantly it allows the terminal to decode fewer frames, which means that the terminal can remain in sleep mode for a greater percentage of frames. When battery usage is an important criterion for this type of service, the later option is preferably used. It is noted that if only broadcast services are supported then, if desired, multiple sub-zones can be created and the features disclosed with respect to preferred embodiments can be applied independently to each sub-zone.

In one aspect of the current invention, an advantageous traffic shaping mechanism is provided suitable for offering broadcast services over an OFDMA wireless network.

Since the throughput available for the service is fixed because the zone size is fixed then the average rate of the total offered load should not exceed this capacity. To ensure this, traffic shaping may be performed by each content provider so that the summed traffic at the base station is well behaved. A simple approach for performing this traffic shaping will be described below. The traffic shaping will be performed to conform the traffic to the characteristics of the radio bearer as opposed to the characteristics of the channel used within the wired network to transport the data. An alternative embodiment is to use a variable bit rate encoder. However, if such streams exhibit long range dependency, then buffering and stream multiplexing would be insufficient to avoid congestion.

Rate controlled encoding can be used by each content provider to ensure that the generated traffic conforms to the Service Level Agreement (SLA) between the content provider and the wireless operator. The quality of such streams varies with the content being displayed.

Note that the wireless operator may reserve a specified amount of resources for each content provider. The content provider may then shape its traffic to utilize these resources as efficiently as possible. If the traffic from a content provider requires excessive resources then the wireless operator may take actions to reduce the resources required (e.g., by dropping packets from the ill-behaved stream). Preferably, the content provider is responsible for determining what actions should be taken.

Note that a content provider may multiplex multiple channels into the stream that is fed to the wireless operator. If this is the case then each terminal that desires one of these channels may decode the entire stream and extract the channel of interest. Therefore some power is wasted in decoding those channels that are not needed. The content provider can instead use a single stream for each channel and reserve resources for each stream from the wireless operator. This reduces the terminal power consumption but multiplexing gains that were possible in combining the channels into a single stream are lost.

In one preferred embodiment, assuming for each stream i, a content provider leases a constant bit rate pipe of size $r_i$. In addition, they both agree upon the maximum queuing delay, $d_i$, of packets in the base station queue (actually the queuing will be performed at the controller which then broadcasts packets to all base stations). Packets that exceed this delay will be dropped. Note that this places a constraint on the burstiness of the traffic offered by the content provider. Large bursts result in larger queuing delays (because the maximum service rate is fixed), which results in more packet losses. Hence the wireless operator guarantees the rate and maximum delay but does not guarantee any specific packet loss rates. A content provider can predict what actions will be taken by the wireless operator and can instead take more appropriate actions for its service. It is able to do this by emulating the queuing that is performed at the base station. The detail is described as the following.

The content provider emulates passage of the generated stream through a buffer of size $r_i d_i$. This virtual queue is serviced at a constant rate $r_i$ with packet durations equal to the frame durations of the broadcast channel. The overflow rate of this buffer is therefore the packet loss rate that the stream will experience at the base station. The content provider can monitor this overflow and if it is undesirable can take appropriate actions. Such actions can include adjusting the encoding rate or dropping low priority packets. For example, for video encoded source, this encoder can drop one or more of the encoded B-frames or P-frames and always transmit the I-frames if there is a need to drop packets to meet the SLA. If multiple channels are multiplexed then one of them may be sacrificed in order to maintain the performance of the others. If multiple layering is performed, packets from the enhancement layer can be dropped to ensure that the base layer gets through. The point is that the specific actions taken are performed by the content provider rather than the wireless operator. Note that one action might be to request additional resources from the wireless operator and such a request will be granted if resources are available.

FIG. 1 provides a block diagram to show the functionality provided by a content provider. In this example, the content provider wishes to broadcast data from N video sources 102a and 102b (collectively 102). The video signals from the sources 102 are provided to encoders 104a and 104b (collectively 104), where the data can be put into a format for transmission. The encoded signals are then provided to multiplexer 106, where a single data stream is provided for transmission to a wireless service provider. In the illustrated example, the multiplexed signal is transmitted over a wired network, denoted by reference numeral 108.

In an embodiment of the invention, a traffic shaping function is performed by the content provider. Traditionally this function is performed with token buckets, however, it is believed that by replicating the queuing performed by the wireless operator more suitable throttling actions can be chosen.

Preferably, the streams are scheduled by the base station, and the scheduler uses specific properties of the inventive traffic shaping mechanism to ensure that the wireless operator provides each stream with the desired SLA guarantees.

The wireless operator is responsible for providing sufficient throughput for a content provider's multiplexed stream such that the overflow rate is equivalent to that experienced if the content provider's offered load was to be queued with a buffer of size $r_i d_i$ and served at a constant bit rate $r_i$. The approach of how the stream can be scheduled so as to achieve this rate is described as the following. To simplify the description, overheads due to signaling and Forward Error Correction are ignored. But these can easily be taken into account.

Assuming N streams are to be supported, if the wireless operator provides a constant bit rate pipe of rate $r_i$ then it can use a queue of size $r_i d_i$ to achieve a maximum delay of $d_i$. This queue is the same as the virtual queue maintained by the content provider. Denote the frame duration by $\tau$ then a (near) constant bit stream rate can be achieved by including $r_i \tau$ bits for stream i in each frame. As pointed out earlier, this approach has drawbacks because the terminal has to be awake for each frame. However it provides the constant bit rate needed for the stream.

From a power utilization point of view, a better approach is to include a single stream in each frame and since the terminal only has to be awake for the frames containing its channel, then power utilization is minimized. However this bursty allocation of radio resources means that the delays experienced at the base station are no longer equivalent to those seen by the content provider in its virtual queue. In order to reduce the maximum delay to more closely correspond to that seen by the content provider, the service rate of the stream may be increased (i.e., a lower channel utilization may be used). Denote the utilization used for stream i by $\rho_i$. This utilization can be determined in advance given $r_i$, $d_i$ and the burstiness of the stream.

Given the stream parameters, the zone size needed to support the service can be determined. Let R denote the rate of the radio bearer and $\tau$ the frame duration, thus yielding $$R = \sum_{i=1}^{N} \frac{r_i}{\rho_i} \quad (1)$$

and hence the above equation can be used to determine the zone size $R\tau$.

If all streams have the same rates then a simple round robin allocation of frames to streams will be sufficient. Each stream will be served $R\tau$ bits every Nth frame and hence achieve an average rate of R/N bps. However, in general, the rates vary among streams. If this is the case then a simple round robin scheduler may not work since some streams are being serviced more often than others. In addition, the time period between service to a stream may no longer be constant. This means that the terminal would not know when next to wake up for its desired channel. Therefore in each frame the location of the subsequent frame in the stream may be provided to the terminal. This means that this information will be known in advance, hence the sequence of frames for a stream will be deterministic.

A preferable scheme for deterministically computing the sequence of frame allocations for each stream can be determined independently by each base station or by a centralized controller. The preferable scheme can be used to provide the indication for the next frame in the sequence.

Consider a queuing system with N input sources. All sources have the same packet size $R\tau$. Source i generates packets at a constant rate with period $x_i=(R\tau \rho_i)/r_i$. All generated packets enter a single queue which is served at a constant rate of one packet every $\tau$ seconds. Hence the offered load to this queue is deterministic (the sum of periodic arrivals) and the packets are also served deterministically. Furthermore note that the total incoming packet rate is:

$$\frac{1}{R\tau} \sum_{i=1}^{N} \frac{r_i}{\rho_i} \quad (2)$$

which, using an R of 1, is simply $1/\tau$ which is the service rate. Since the system is completely deterministic, the sequence of frame allocations for each stream can therefore be determined.

Figure 2:
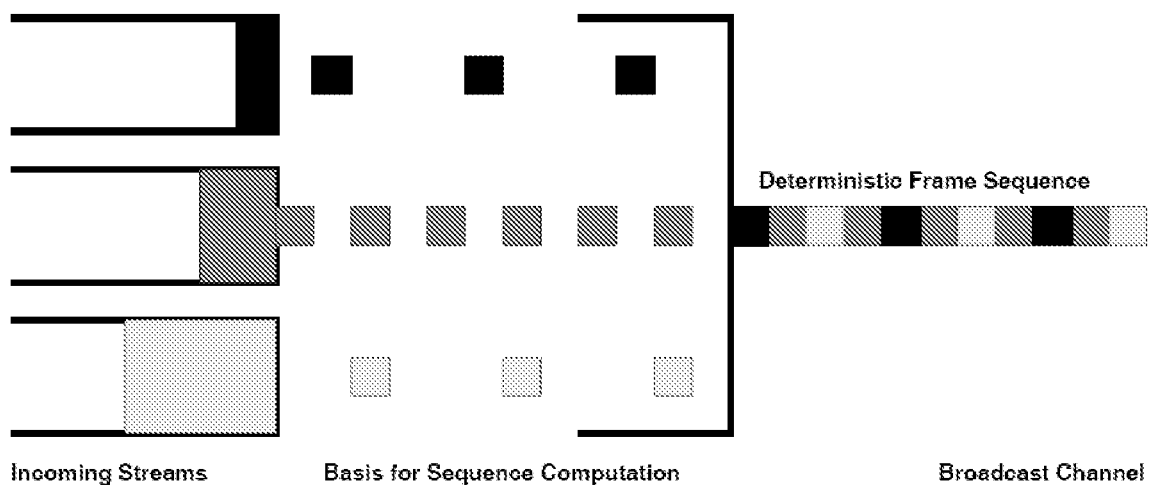
FIG. 2 is a block diagram showing the assignment of data streams into frames.

As an example, FIG. 2 illustrates a deterministic sequence obtained from multiplexing of the incoming streams. Also shown in FIG. 2 are the incoming queues of the real traffic streams. This traffic is queued and served in bursts. Each burst contains $R\tau$ bits and is generated every $x_i$ seconds.

The frame sequence for a particular stream can be computed as follows. Assume that at time zero all streams generate a packet and from then onwards stream i generates a packet every $x_i$ seconds. Let $S_i(k)$ denote the index of the frame that is used to transmit packet number k+1 from stream i. This packet arrives at time $kx_i$.

First note that, in steady state, the queue is generally non-zero. Suppose that this was not the case and that the probability of the queue becoming empty is non-zero. Since the channel utilization is then one, whenever the queue becomes empty the total number of served packets becomes one less than the total number of incoming packets. Therefore the expected value of the queue size increases by one each time this event occurs. This means that the expected value of the queue will grow to infinity. However, as the expected value of the queue increases to infinity, the probability that the queue becomes empty goes to zero. This contradicts our initial assumption that the queue becomes zero with non-zero probability in steady state.

Hence since the queue remains non-zero, then the total number of departures from the start of service to the time of arrival of packet k+1 for stream i is $\lfloor kx_i \rfloor$. During this period the total number of arrivals from stream i is k. Assuming that lower numbered streams have higher priority in the queue than higher numbered streams, the total number of arrivals from a stream j with higher priority is given by $\lfloor (kx_i)/x_j \rfloor +1$ while the total number of arrivals from a stream l with lower priority is given by $\lceil (kx_i)/x_l \rceil$. Note that these arrivals include those packets that were generated at time zero. By subtracting the number of departures from the total number of arrivals, the number queued ahead of the packet from stream i when it arrives can be obtained. This packet arrives in frame index $\lfloor kx_i \rfloor$ and will be served in the first frame right after all the packets ahead of it are served. Hence this frame index is given by:

$$S_i(k) = 1 + \lfloor kx_i \rfloor + k + \sum_{j=1}^{i-1}\left(1 + \left\lfloor \frac{kx_i}{x_j}\right\rfloor\right) + \sum_{j=i+1}^{N}\left\lceil \frac{kx_i}{x_j}\right\rceil - \lfloor kx_i \rfloor \quad (3)$$

$$= k + i + \sum_{j=1}^{i-1}\left\lfloor \frac{kx_i}{x_j}\right\rfloor + \sum_{j=i+1}^{N}\left\lceil \frac{kx_i}{x_j}\right\rceil.$$

For example if all N streams have the same period then $S_i(k)=Nk+i$ which is round robin service. Consider a more complicated scenario in which N=10. Streams 1 to 3 generate packets with period 7.5, streams 4 to 7 generate packets with period 10 and streams 8 to 10 generate packets with period 15. It is assumed that at time zero each stream generates a packet. Furthermore it is assumed that a stream has higher priority over all higher numbered streams. Using Equation (3), the stream allocations for the first sixty frames are obtained as the following:

1 2 3 4 5 6 7 8 9 10 1 2 3 4 5 6 7 1 2 3 8 9 10 4 5 6 7 1 2 3

1 2 3 4 5 6 7 8 9 10 1 2 3 4 5 6 7 1 2 3 8 9 10 4 5 6 7 1 2 3

Note that the first thirty allocations are repeated and in fact this cycle repeats forever. Next it is shown that, in steady state, this is true in general.

Since the packets generated for stream i is periodic with period $x_i$ then when all streams are multiplexed the resulting stream will be periodic with period given by the Lowest Common Multiple (LCM) of the set of periods $x_i$. Since a First-In-First-Out (FIFO) servicing discipline is used then the output sequence is also deterministic and so will also repeat with the same period. Hence in steady state the frame sequence produced by the scheduler is cyclic with period given by the LCM of the stream periods. In the example above, LCM(7.5, 10, 15)=30.

Recall that $x_i=R\tau p_i/r_i$. Supposing the same utilization for each stream, the stream rates are generally multiples of some basic rate (e.g., 64 kbps). Therefore the sequence period will typically be some small multiple of the largest stream period.

It is noted that this notion of a queuing system between the queues of the incoming streams and the broadcast channel are solely used to illustrate how the frame sequence is determined. Once the frame sequence is determined then the scheduler simply serves each stream in the order determined by this sequence.

A further aspect of the current invention relates to the channel switching time. Once a terminal decides to switch to another channel, the average time taken to do this depends on the average time between frames allocated for the stream. For stream i this average is given by $x_i/2=R\tau p_i/(2r_i)$. Hence the switching times for all streams grow with $R\tau$ which is the zone size. If the switching time is unacceptable, the zone can be subdivided into two or more sub-zones. Each stream is then allocated to one of these sub-zones. For example, if two sub-zones are used then the switching times will be reduced by a factor of two. Also note that the switching time increases inversely with the stream rate. However, since high rate services are associated with higher QoS then having lower switching times for such streams is desirable. Note that other factors also affect the switching times (such as playback buffer size, signaling latency, etc.).

Typically multiple layers are created for each stream. For example, a base layer can be generated for all users, while an enhancement layer can be simultaneously transmitted but targeted for those users with good radio conditions. In other words the modulation and coding for the base layer is chosen so that it can be received by all terminals while another is used for those terminals closer to the antenna. If each stream burst contains only base layer information or only enhancement layer information then the terminals that cannot correctly decode the enhancement layer bursts (determined from previous attempts) or terminals with low battery levels can ignore those bursts containing the enhancement layer.

A similar approach can be used for the systematic bits of the Forward Error Correction (FEC) algorithm. Suppose that these are placed in a separate burst following the bursts containing the data. Those terminals that correctly decode the data can ignore the subsequent FEC burst since it is not needed. This results in power saving for those terminals.

Note that if the total offered load is decreased and the same zone size is maintained, the resources can still be fully utilized. In this case there will be some bursts with no allocated stream. Since the scheduler knows the identity of these bursts it can instead allocate them to other types of traffic (e.g., unicast services). In the extreme case where the entire frame is used as a zone the resulting system will time multiplex broadcast and unicast services.

Note that the frame sequence for each stream depends on the number of other streams sharing the channel as well as the rates of those streams. However, once the frame sequence is determined, the performance of the service provided to the stream can be determined in isolation because its frame allocations are guaranteed. Hence in this section the performance of a single stream is evaluated. It is investigated how bursty scheduling affects delay performance. It is also investigated how delay performance can be improved through adjusting the channel utilization.

A trace file is prepared. More specifically, a trace file with rate-controlled encoding (using H.263) targeted at 256 kbps is used. This has a frame rate of 25 fps. However, multiple video frames may be combined into a single packet and so packets may not be generated every 40 ms but sometimes at some multiple of 40 ms. The peak to mean ratio of packet sizes is 9.24 resulting in bursty arrivals.

For the radio broadcast channel, it is assumed a frame size of 5 ms. Hence there may be 8 or more frame broadcasts between video packet arrivals from the source. First evaluated is the performance of the case in which each radio frame is used to transmit information for the stream. This would provide the constant bit rate service assumed in the virtual queuing system at the source.

Therefore each frame contains at most 256×5 bits for the stream. Note that since the service rate is constant, the delay of newly arriving packets can be computed as the product of the queue size and the service rate. Over the first 7.5 minutes of the film the maximum and mean values of this delay is determined and these results presented in Table I.

TABLE 1

DELAY STATISTICS

|  | Utilization | Ave Delay (ms) | Max Delay (ms) |
| --- | --- | --- | --- |
| CBR Service | 100% | 223 | 480 |
| Bursty Service | 100% | 236 | 520 |
| Bursty Service | 99.8% | 195 | 493 |

Next, the delay performance of the proposed scheduling scheme is investigated. It is assumed that the total traffic is such that an average of one out of every eight radio frames is allocated to this particular stream. Depending on the nature of the other streams, the frame allocations may not be periodic. In the worst case the frame allocations will alternate between a frame separation of 1 and a frame separation of 15. Therefore, it is assumed this worst case allocation. It is determined the maximum and mean delays for this case and find that both metrics are higher than that obtained for the constant bit rate service (see Table I).

Next it is investigated how the delay metric can be improved by reducing the channel utilization from 100%. In the previous case a total of 256×5×8 bits were served in each burst. In this case, it is assumed that d256×5×40/0.998e bits be served in each burst. For this case, it reveals that the maximum and mean delays are better than those observed for the constant bit rate case. Therefore by using slightly more resources, a similar delay performance can be achieved as that observed by the content provider while using the proposed algorithm to efficiently schedule streams.

Figure 3A:
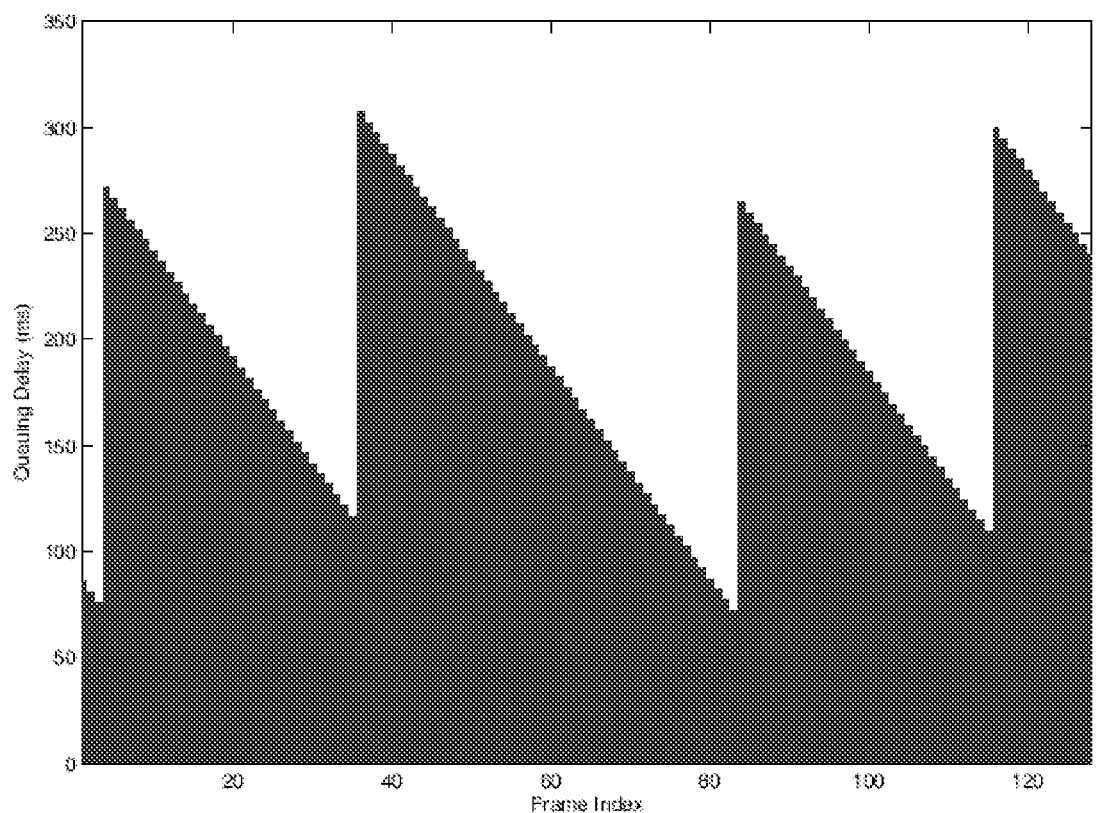
FIGS. 3a and 3b provide simulation data.
Figure 3B:
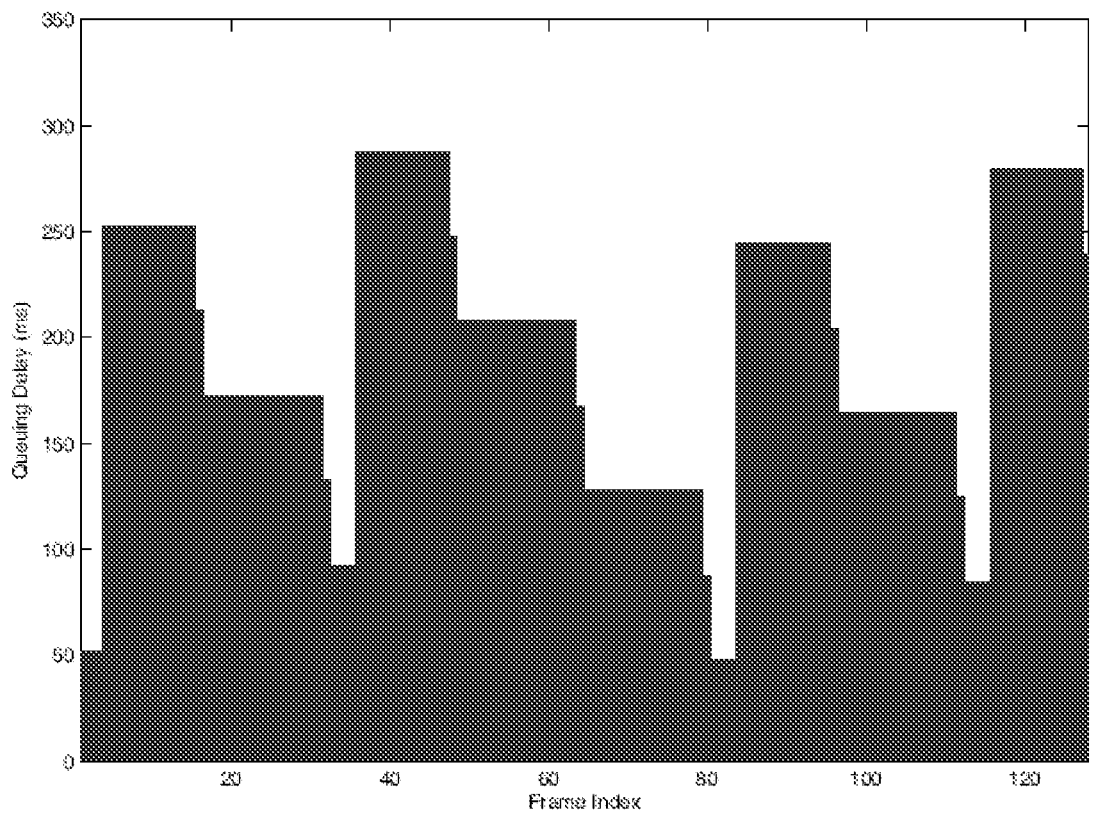

In FIG. 3a, the queuing delay is plotted as a function of frame index for the first 128 radio frames of the second minute of the film. In FIG. 3b the same information is plotted, but for the case of bursty scheduling and a utilization of 99.8%. Note the bursty nature of the service for the scheduled case. However also note that, because of the lower channel utilization, incoming bursts are processed faster thus reducing the size of queuing peaks. Naturally a burstier video source will require even lower channel utilization but the loss in capacity will typically be negligible.

Preferred embodiments describe features of supporting broadcast services over a OFDMA broadcast channel such as that provided in the WiMAX standard. A simple traffic shaping framework is presented that uses the properties of this framework to develop a scheduler for allocating resources to streams over a radio channel. This scheduling algorithm provides deterministic allocations making it possible to indicate to each terminal when next it should awake for a frame containing data for its desired channel. Although the resulting scheduling algorithm provides bursty servicing, it is shown that by making a small increase in the number of resources allocated to the service one can achieve similar delay performance as that agreed upon with the content provider. Simulation results were then used to illustrate the approach. Note that, the approach described in preferred embodiments can be used to address issues such as FEC and layering.

The scheduler described above for allocating resources to streams over the radio channel provides deterministic allocations, thus making it possible to indicate to each terminal when it should awake for a frame containing data for its desired channel. Also, by making a small increase in the number of resources allocated to the service, similar delay performance as that agreed upon with the content provider can be achieved.

Method embodiments of the invention will now be described. The details provided here supplement (and are supplemented by) the discussion above.

In a first embodiment, data is broadcast, e.g., from a base station. The base station receives a number of broadcast data streams, which may be, for example, video, audio, text or any other data. As an example, the broadcast data streams might be received from a content provider to a wireless service provider.

The broadcast data streams are assigned into a number of frames. In a first embodiment, each frame includes data from no more than one of the broadcast data streams. The frames can then be broadcast wirelessly, e.g., to a number of mobile users.

In one embodiment, each frame includes information related to a next frame that will include data from that same broadcast data stream. This way each mobile user is only required to process the frames that include data of interest and can, for example, remain in a low power mode at other times. The location of broadcast data within each frame can be pre-specified and known by the mobile stations. An identity of the broadcast data stream within a particular frame can be indicated in log(N) bits, where N is the number of broadcast data streams assigned into the plurality of frames.

In another embodiment, each frame includes multiple zones so that each zone can use the approaches described herein. For example, two or more zones are created within each frame and the proposed method is applied to each zone. This reduces the switching time (e.g., the time taken to switch from one stream to another) but increases power consumption.

In another example, the sequence can be determined by the base station and broadcast to all mobile users. For example, the frame sequence for each stream is computed by the base station and broadcast to all mobile stations. Each mobile station that desires a specific stream can successively decode each frame until it finds one containing the stream of interest. The mobile station can then use the frame sequence for the stream that was broadcast by the base station to determine when next the stream will be served. In this case a next frame indicator is no longer needed for each frame.

In another embodiment, the base station can sense a reduction in rate for a particular broadcast data stream and transmitting a different frame in a slot allocated for the particular broadcast data stream in the frame sequence. In other words, if there is a reduction in rate for a stream then a base station can "skip" the next frame in the sequence and instead allocate it to other types of traffic (e.g., unicast traffic).

In an embodiment, the sequence of frame allocations for the broadcast streams can be deterministically computed. Information related to the deterministically computed sequence of frame allocations can be included in each frame. The computation can be performed at a base station or at a centralized controller that is remote from but communicatively coupled to a base station of a wireless communication system.

A stream can be split into two (or more) substreams with each substream carrying a different layer of information. For example, high definition devices can decode all substreams while lower definition devices can decode a subset of the substreams (reduced power consumption and processing capacity). Some substreams may use aggressive modulation and coding and hence can only be decoded by mobile stations close to the basestation while the other substreams use a more conservative MCS (Modulation and Coding Scheme) and is decodable by all mobile stations. Again, all of this is possible because the frame sequence for each substream can be determined in advance with the proposed approach.

From the perspective of a mobile user, for a particular embodiment, a frame of data is received from a wireless communication link. Broadcast data and next frame information are retrieved from the frame. The next frame information provides information related to a next frame of data that includes data related to the retrieved broadcast data. The next frame of data can then be received and processed without processing intervening frames of data. In one example, each frame includes data related to no more than one information stream. In another example, each frame includes two or more zones, each of which includes data related to no more than one information stream.

In another embodiment, a frame sequence is received from a wireless communication link. A number of frames are then received from the wireless communication link and successively decoded until a frame that contains a stream of interest is found. The frame sequence can then be used to determine when a next frame that contains the stream of interest will be served. For example, frames received between the frame that contains the stream of interest and the next stream of interest are not decoded.

In one particular example, the method is performed in a mobile handset. Receiving circuitry of the mobile handset is placed in a low power mode during a time between when the frame that contains the stream of interest is received and when the next stream of interest is received.

Although the present invention and its advantages have been described in detail, it should be understood that various changes, substitutions and alterations can be made herein without departing from the spirit and scope of the invention as defined by the appended claims.

What is claimed is:

1. A method of broadcasting data, the method comprising:
   receiving broadcast data streams processed with different modulation and coding schemes;

assigning broadcast data streams to different frames in a sequence of frames, at least some frames in the sequence of frames including data the same broadcast data stream; and wirelessly transmitting the sequence of frames over a broadcast channel to a plurality of mobile stations, each earlier frame in the sequence of frames, that carries data from the same broadcast data stream as one or more subsequent frames in the sequence of frames, including an index identifying a next frame, in the sequence of frames, to be transmitted over the broadcast channel that carries data from the same broadcast data stream as the earlier frame, wherein the index in each earlier frame is determined based upon a periodicity of non-consecutive frames assigned to the same broadcast data stream of the earlier frame, at least two of the broadcast data streams assigned non-consecutive frames with different periodicities.

2. The method of claim 1, wherein a location of broadcast data within each. frame in the sequence of frames is pre-specified and known by the mobile stations.

3. The method of claim 1, wherein an identity of the broadcast data stream within a particular frame is indicated in log(N) bits, where N is the number of the broadcast data streams assigned to the sequence of frames.

4. The method of claim 1, further comprising:
computing a frame sequence for each broadcast data stream; and
broadcasting an indication of each the frame sequences to the plurality of mobile stations.

5. The method of claim 4, wherein each mobile station that desires a specific broadcast data stream can successively decode each frame until the mobile station finds a frame containing the specific broadcast data stream and wherein the mobile station can then use the frame sequence that was broadcast to determine when next the specific broadcast data stream will be served.

6. The method of claim 1, wherein the sequence of frames are transmitted over an Orthogonal Frequency Division Multiple Access (OFDMA) wireless network.

7. The method of claim 1, wherein at least two of the broadcast data streams comprise video data.

8. The method of claim 1, further comprising deterministically computing a. sequence of frame allocations for the broadcast data streams.

9. The method of claim 8, further comprising including information related to the deterministically computed sequence of frame allocations in each frame.

10. The method of claim 8, wherein the sequence is determined at a base station of a wireless communication system.

11. The method of claim 8, wherein the sequence is determined at a centralized controller remote from but communicatively coupled to a base station of a wireless communication system.

12. The method of claim 8, wherein each frame includes information related to a next frame that will include data from that same broadcast data stream, wherein the sequence is used to determine the information related to the next frame.

13. The method of claim 1, wherein first and second ones of the broadcast data stream include substreams of a stream of data, each substream carrying a different layer of information related to the data.

14. The method of claim 13, wherein the substreams include standard definition data and high definition data.

15. An apparatus comprising:
a processor; and
a non-transitory computer readable storage medium storing programming for execution by the processor, the programming including instructions to:
receive broadcast data streams processed with different modulation and coding schemes,;
assign each of the broadcast data streams to a different frame in a sequence of frames, at least some frames in the sequence of frames including data from the same broadcast data stream; and
wirelessly transmit the sequence of frames over a broadcast channel to a plurality of mobile stations, each earlier frame in the sequence of frames, that carries data from the same broadcast data stream as one or more subsequent frames in the sequence of frames, including an index identifying a next frame, in the sequence of frames, to be transmitted over the broadcast channel that carries data from the same broadcast data stream as the earlier frame, wherein the index in each earlier frame is determined based upon a periodicity of non-consecutive frames assigned to the same broadcast data stream of the earlier frame, at least two of the broadcast data streams assigned non-consecutive frames with different periodicities.

16. A method of broadcasting data, the method comprising:
receiving a first broadcast data stream and a second broadcast data stream;
assigning the first broadcast data stream and the second broadcast data stream to different frames in a sequence of frames, the first broadcast data stream being assigned to at least an earlier frame in the sequence of frames and a subsequent frame in the sequence of frames, the second broadcast data stream being assigned to an intermediate frame in the sequence of frames that is positioned in-between. the earlier frame and the subsequent frame; and
wirelessly transmitting the sequence of frames over a broadcast channel to a plurality of mobile stations, the earlier frame carrying an index identifying a location of the subsequent frame within the sequence of frames, wherein the index in each earlier frame is determined based upon a periodicity of non-consecutive frames assigned to the same broadcast data stream of the earlier frame, at least two of the broadcast data streams assigned non-consecutive frames with different periodicities.

17. The method of claim 16, wherein the first broadcast data stream and the second broadcast data stream carry data processed with different modulation and coding schemes.

18. The method of claim 16, wherein the first broadcast data stream and the second broadcast data stream carry the same data processed with different modulation and coding schemes.

19. An apparatus comprising:
a processor; and
a non-transitory computer readable storage medium storing programming for execution by the processor, the programming including instructions to:
receive a first broadcast data stream and a second broadcast data stream;
assign the first broadcast data stream and the second broadcast data stream to different frames in a sequence of frames, the first broadcast data stream being assigned to at least an earlier frame in the sequence of frames and a subsequent frame in the sequence of frames, the second broadcast data stream being assigned to an intermediate frame in the sequence of frames that is positioned in-between the earlier frame and the subsequent frame; and wirelessly transmit the sequence of frames over a broadcast channel to a plurality of mobile stations, the earlier frame carrying an index identifying a location of the subsequent frame within the sequence of frames, wherein the index in each earlier frame is determined based upon a periodicity of non-consecutive frames assigned to the same broadcast data stream of the earlier frame, at least two of the broadcast data streams assigned non-consecutive frames with different periodicities.

20. A method comprising:

receiving, by a mobile station over a broadcast Channel, at least an earlier frame and a subsequent frame in a sequence of frames, the earlier frame and the subsequent frame being associated with a first broadcast data stream, the earlier frame carrying an index identifying a location of the subsequent frame within the sequence of frames, and the sequence of frames further including an intermediate frame not associated with the first broadcast data stream that is positioned in-between the earlier frame and the subsequent frame, wherein the index in each. earlier frame is determined based upon a periodicity of non-consecutive frames assigned to the same broadcast data stream of the earlier frame, at least two of the broadcast data streams assigned non-consecutive frames with different periodicities; and identifying, by the mobile station, the location of the subsequent frame within the sequence of frames in accordance with the index carried within the earlier frame.

21. A mobile station comprising:

a processor; and a non-transitory computer readable storage medium storing programming for execution by the processor, the programming including instructions to:

receive, over a broadcast channel, at least an earlier frame and a subsequent frame in a sequence of frames, the earlier frame and the subsequent frame being associated with a first broadcast data stream, the earlier frame carrying an index identifying a location of the subsequent frame within the sequence of frames, and the sequence of frames further including an intermediate frame not associated with the first broadcast data stream that is positioned in-between the earlier frame and the subsequent frame, wherein the index in each earlier frame is determined based upon a periodicity of non-consecutive frames assigned to the same broadcast data stream of the earlier frame,. at least two of the broadcast data streams assigned non-consecutive frames with different periodicities; and identify the location of the subsequent frame within the sequence of frames in accordance with the index carried within the earlier frame.

\* \* \* \* \*